United States Patent [19]
Katzman et al.

[11] 3,936,803
[45] Feb. 3, 1976

[54] DATA PROCESSING SYSTEM HAVING A COMMON CHANNEL UNIT WITH CIRCULATING FIELDS

[75] Inventors: James A. Katzman; Yoshiro Yoshioka, both of San Jose, Calif.

[73] Assignee: Amdahl Corporation, Sunnyvale, Calif.

[22] Filed: Nov. 19, 1973

[21] Appl. No.: 417,256

[52] U.S. Cl. .............................................. 340/172.5
[51] Int. Cl.² ............................................. G06F 3/04
[58] Field of Search ................. 340/172.5, 146.1 C

[56] References Cited
UNITED STATES PATENTS

| | | | |
|---|---|---|---|
| 3,587,044 | 6/1971 | Jenkins | 340/172.5 X |
| 3,680,057 | 7/1972 | Blessin et al. | 340/172.5 |
| 3,699,530 | 10/1972 | Capowski et al. | 340/172.5 |
| 3,786,435 | 1/1974 | Sherman | 340/172.5 |

Primary Examiner—Gareth D. Shaw
Assistant Examiner—Michael C. Sachs
Attorney, Agent, or Firm—Flehr, Hohbach, Test, Albritton & Herbert

[57] ABSTRACT

A data processing system where transfers of information are made between I/O devices and system storage through channels is a channel unit having common apparatus shared among all the channels. The common apparatus includes a sequentially accessed state memory and a plurality of processors. The state memory includes a memory location for each channel. The processors have access to different parts of the state memory and perform functions in response to stored information. A data access processor controls transfers between system storage and the channel unit. A controller interface processor controls transfers between the channel unit and I/O devices. The quantity of information to be transferred for each channel is stored in the state memory. Each time a portion of the total transfer is completed, a count field in the state memory is updated. In one embodiment, only the low-order bits of the total count are stored in the state memory and the balance or high-order bits of the count are stored in channel memory.

13 Claims, 6 Drawing Figures

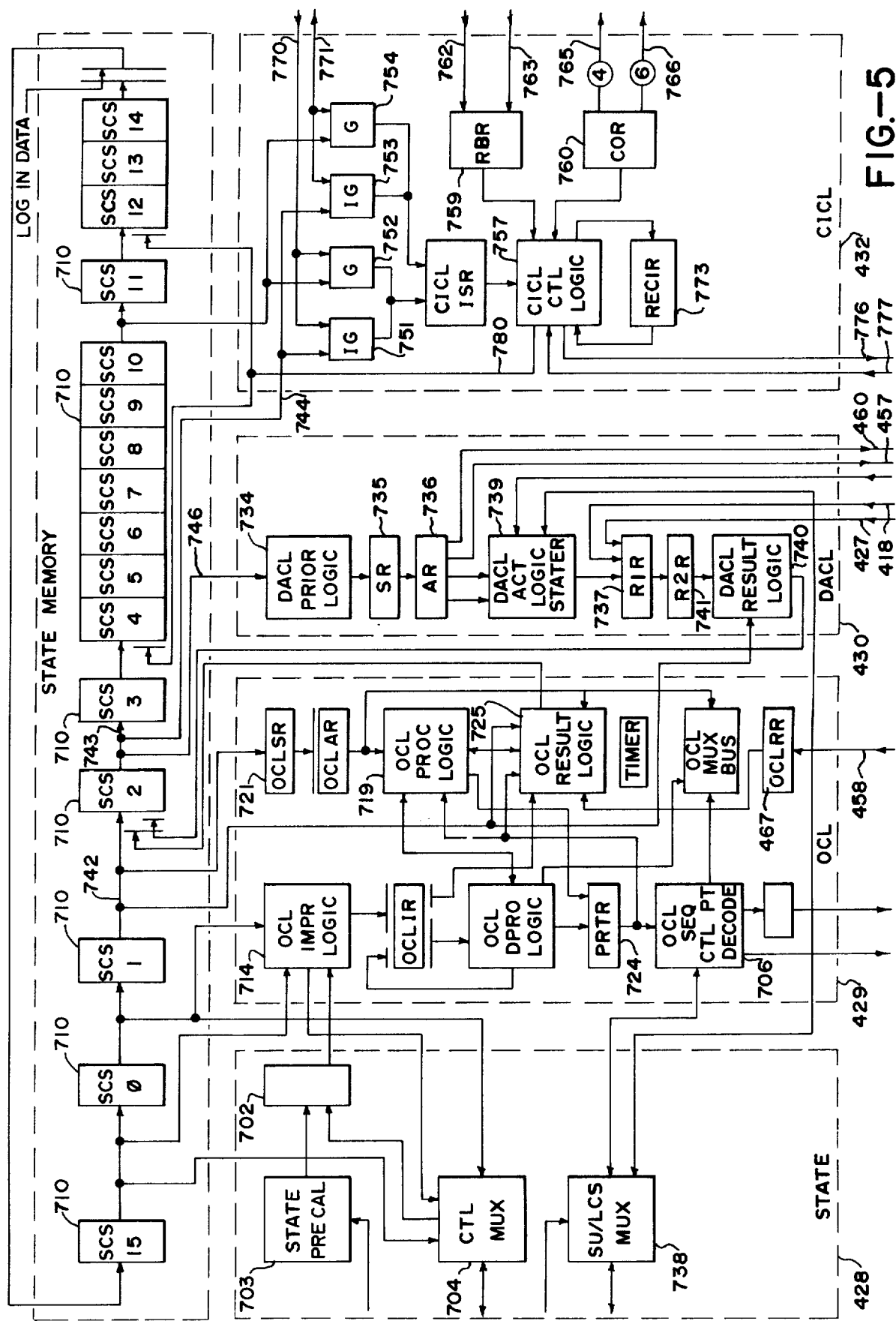

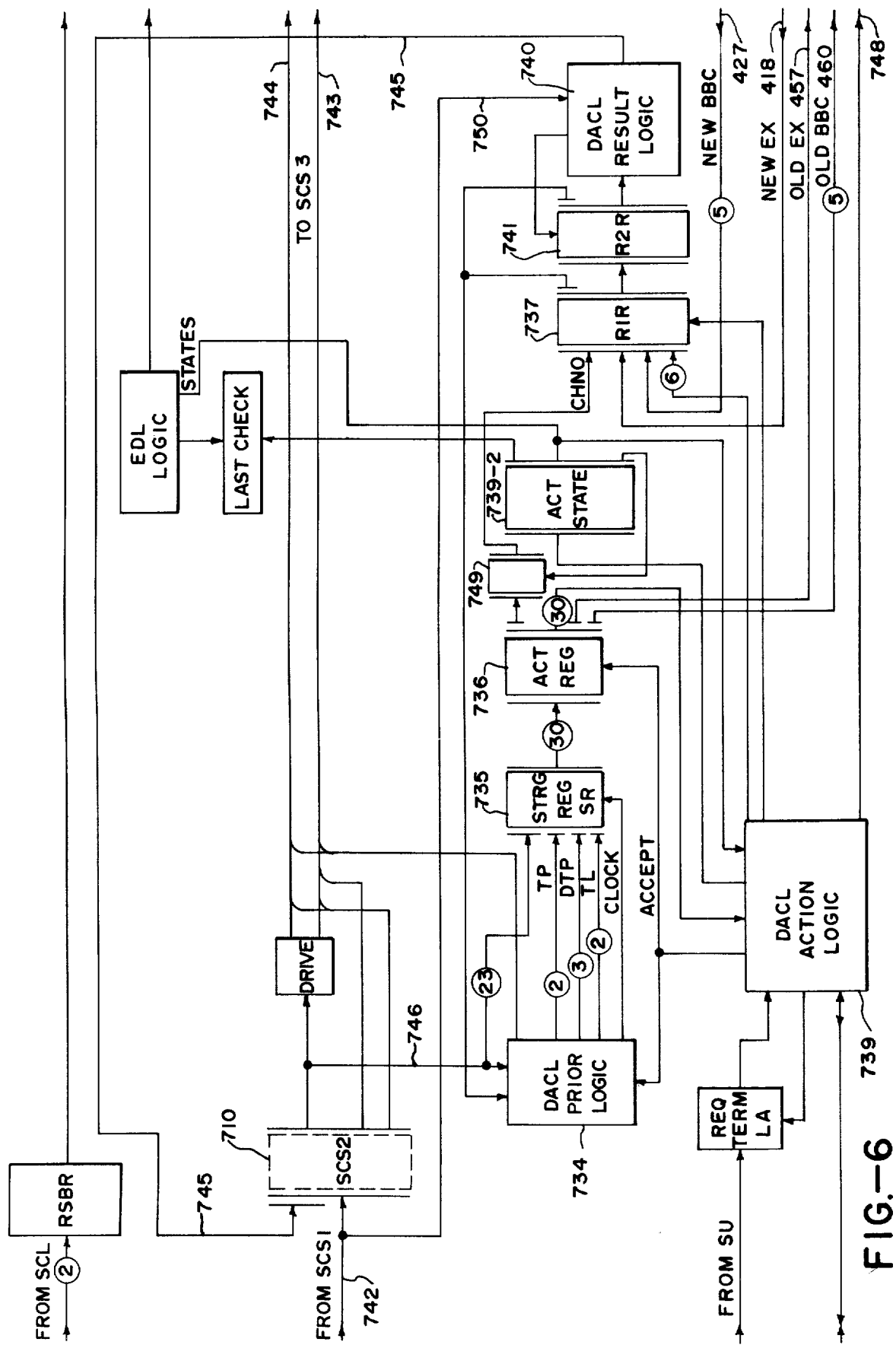

DATA PROCESSING SYSTEM HAVING A COMMON CHANNEL UNIT WITH CIRCULATING FIELDS

CROSS REFERENCE TO RELATED APPLICATIONS

1. DATA PROCESSING SYSTEM HAVING AN INSTRUCTION PIPELINE FOR CONCURRENTLY PROCESSING A PLURALITY OF INSTRUCTIONS. Ser. No. 302,221, now U.S. Pat. No. 3,840,861, filed Oct. 30, 1972, invented by Gene M. Amdahl, Glenn D. Grant and Robert M. Maier, and assigned to Amdahl Corporation now U.S. Pat. No. 3,840,861.

2. CHANNEL DYNAMIC ADDRESS TRANSLATION, Ser. No. 312,733, filed Dec. 6, 1972, invented by Takesi Maruyama, Tatsuya Yoshikawa, Yoshiro Yoshioka and Richard L. Bishop, and assigned-in-part to Amdahl Corporation.

BACKGROUND OF THE INVENTION

The present invention relates to the field of instruction-controlled digital computers and specifically to methods and apparatus associated with the channels within data processing systems.

In prior art, channels have been architecturally defined as that part of the data processing system which serves control units associated with the system's input/output (I/O) devices. Channels have been independent and discrete apparatus having their own set of commands which enable the I/O devices to read and write data while the remainder of the system concurrently processes instructions not necessarily related to I/O devices. Each channel has had its own instructions in system storage which have been fetched and processes under supervisory program control.

Channels are generally of three types, selector, byte multiplexor, and block multiplexor. Selector channels and block multiplexor channels are generally associated with high-speed devices, while byte multiplexor channels are usually associated with low-speed devices. A plurality of I/O devices are connected to a channel unit through a control unit. Byte multiplexor channels and block multiplexor channels allow interleaved transfer of data from multiple devices attached to the same physical channel interface.

While channels function somewhat independently of instructions executed by the data processing system, the data processing system maintains supervisory control over the channel and I/O operations. Channels are therefore processors of information which have some independence from other system processors (e.g., I-unit) and hence increase the concurrency of the processing of information by the system.

Whereas I/O devices operate at comparatively limited speeds which limit the maximum data rate over a channel, frequently due to mechanical limitations, and whereas electronic circuits operate at much higher speeds, it is desirable that high-speed circuits be shared by a plurality of slow-speed I/O devices in order to make more efficient use of high-speed circuit capabilities. In prior art channel structures in which channel apparatus has been dedicated on a per channel basis, the circuits in one channel have not been readily shared with other channels.

In channel structures with shared high-speed apparatus, it is desirable that control operations, such as recording the number of bytes transferred, be carried out without unduly degrading system performance. There is a need for improved methods and apparatus for processing control information in channel apparatus.

SUMMARY OF THE INVENTION

The present invention is a method and apparatus for channels which interconnect I/O devices with the remainder of the data processing system. A channel unit services a plurality of channels with common apparatus which is divided into parts where those parts are assigned to different channels, one part per channel at a time. At different times, the allocation of channel parts is changed so that, over a period of time, each channel has access to each part in order to carry out complete channel functions.

Those different parts include state logic, operation logic, storage unit access logic and I/O control unit logic. The channel unit also includes a channel memory having storage locations allocatable to each channel, channel registers for storing data, and a channel data manipulator for manipulating information associated with the storage of data in the channel registers and in the channel memory.

The different parts of the channel are under control of channel control logic which includes a sequentially accessed channel state memory. In accordance with the present invention, the channel state memory includes, for each channel, a count field for specifying all or part of the number of bytes to be transferred. In one embodiment, only the low-order five bits of a complete transfer count field are stored in the state memory and the high-order eleven bits are stored in the channel memory. An additional field is then included within the state memory to specify whether the high-order field stored in the channel memory contains high-order bits or is empty. If not empty the channel memory is accessed whenever the low-order bits in the state memory require a borrow from the high-order bits. By maintaining some or all of the count field in the state memory, many accesses to channel memory are avoided thereby enhancing the data rate of transfers through the channel unit.

In accordance with the above summary, a data processing system having a common channel unit with circulating fields is provided which performs high-speed channel operations making efficient use of common channel apparatus.

Additional objects and features of the invention will appear from the following description of which the preferred embodiments of the invention have been set forth in detail in conjunction with the drawings.

BRIEF DESCRIPTION OF THE DRAWINGS

FIG. 5 depicts a further detailed schematic representation of the channel control logic which forms a part of the channel unit of FIG. 3.

FIG. 6 depicts a schematic representation of the data access control logic which forms a part of the channel control logic of FIG. 5.

DETAILED DESCRIPTION

Figure 1:
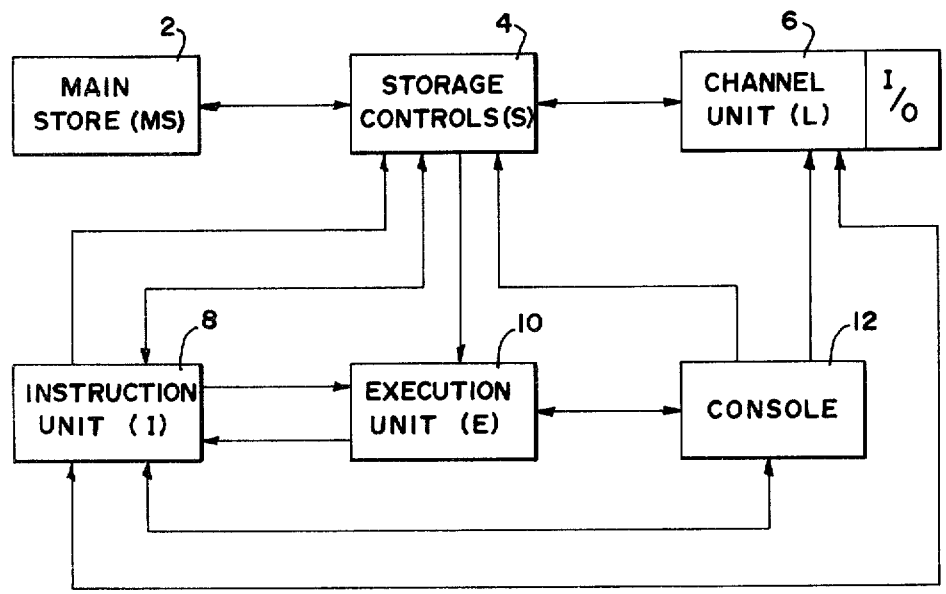
FIG. 1 depicts a block diagram of the overall data processing system of the present invention.

Overall System - FIG. 1

In FIG. 1, the data processing system of the present invention is shown to include a main store 2, a storage control unit 4, an instruction unit 8, an execution unit 10, a channel unit 6 with associated I/O and a console unit 12. The system of FIG. 1 operates under control of system instructions where an organized group of those instructions forms a system program. System instructions and the data upon which the instructions operate are introduced from the I/O equipment via the channel unit 6 through the storage control unit 4 into the main store 2. From the main store 2, system instructions and data are fetched by the instruction unit 8 through the storage control 4 and are processed so as to control the execution within the execution unit 10. The system of FIG. 1 is described in more detail in the above-referenced application entitled DATA PROCESSING SYSTEM HAVING AN INSTRUCTION PIPELINE FOR CONCURRENTLY PROCESSING A PLURALITY OF INSTRUCTIONS which description is hereby incorporated by reference in the present specification for the purpose of teaching the overall general operation of a suitable instruction-controlled data processing system.

In addition to the above-referenced patent specifications, the publication "IBM System/370 Principles of Operation", SRL GA22-7000-3 published by IBM Corporation, is hereby incorporated by reference for the purpose of further teaching the general details of a data processing system compatible with the present invention.

CHANNEL UNIT - FIG. 2

Figure 2:
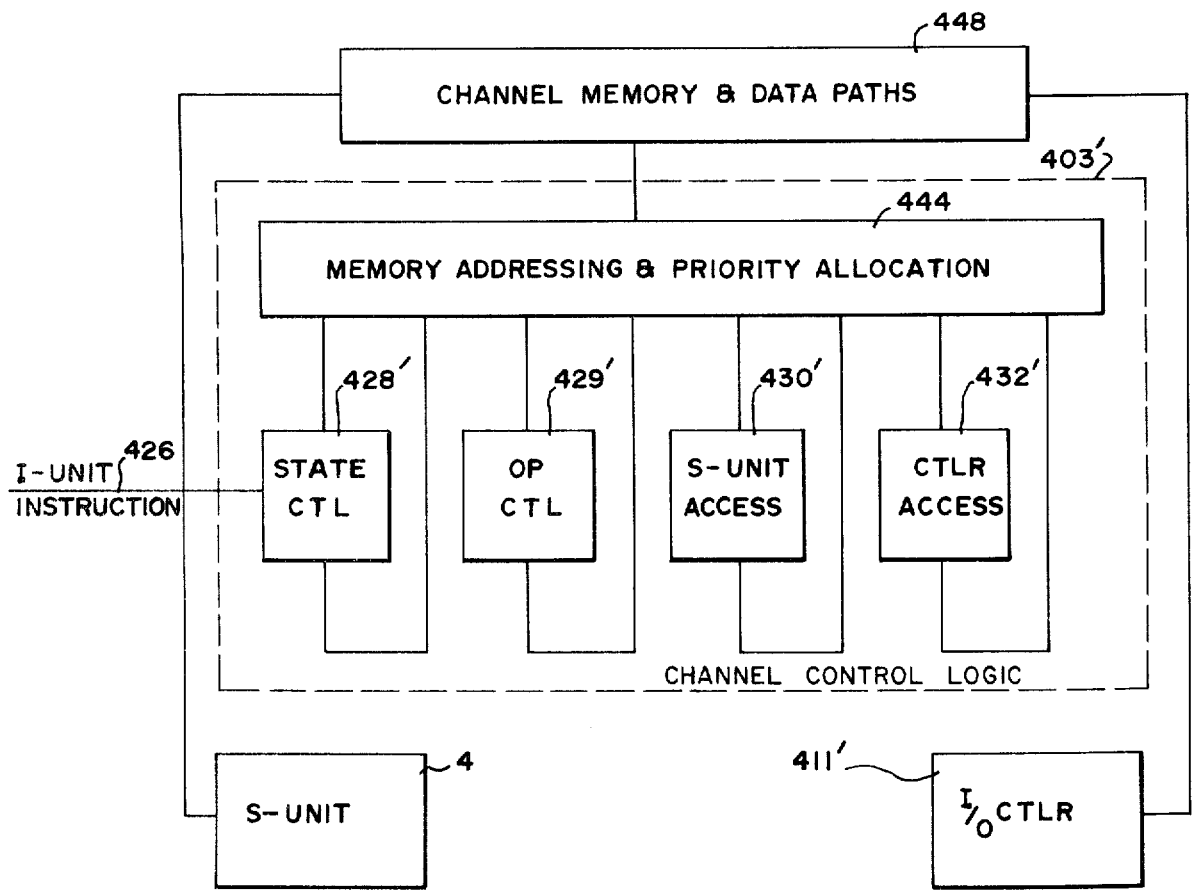
FIG. 2 depicts a schematic representation of the channel unit of the present invention.

In FIG. 2, the channel unit 6 of FIG. 1 is shown in schematic form connecting the I/O controllers 411' to the S-unit 4. The number N of channels is variable, but, for the present specification, N is 16 indicating 16 channels. The channel control logic CCL 403' operates to control the channel apparatus and the allocation of its different parts to specific channels. The channel control logic 403' includes a memory addressing and priority allocation unit 444 for determining which part of the channel control logic 403' will be allocated to which channel. Logic 403' additionally includes four control segments (parts) which are attached to the memory addressing unit 444. Although FIG. 2 shows division into four segments, other divisions are possible. Each of the control logic segments may be dedicated to specific functions where each segment operates independently of the others. In FIG. 2 state control 428' receives an instruction for a specific addressed channel from the I-unit on input bus 426. State control 428' then suitably addresses and modifies the one of the sixteen channel state store locations contained in the channel memories 448 which corresponds to the addressed channel. Subsequently, other control logic segments perform operations required to implement the instruction from the I-unit. The operations typically include accessing the S-unit by S-unit access logic 430', control word processing by the op control 429' or transfer of data to a control unit 411'. Typically, each logic segment 428', 429', 430' or 432' will itself modify the channel state store, in the channel memories 448 as it performs its operations. These operations typically require accesses to other channel memories contained in the channel memory 448.

The input from the I-unit 8 of FIG. 1 via line 426 is derived from the effective address register (not shown) of that I-unit where, at appropriate times, a channel number (four low-order bits of an 8-bit byte) are generated designating, in a 16 channel system, which one of 16 channels is to be currently processed. The channel specified on line 426 is processed by different channel unit parts at different times. For a given transfer, the state control logic 428' receives the command and channel number from the I-unit unit and modifies the channel state store location associated with that channel, such that other control logic segments perform coordinated actions. In the 16 channel example, the channel state memory includes 16 locations and the particular one associated with the channel specified on line 426 is addressed by the circuitry 444.

The operations performable by the channel unit 6 of FIG. 1 include transfers of information between the S-unit 4 and the channel memory 448, and transfers of information between the channel memory 448 and I/O devices through the I/O control units 411'. Transfers between the S-unit and the channel memory 448 are under control of the S-unit access memory and controls 430'. Similarly, transfers between the channel memory 448 and the I/O controllers 411' are under control of the CTLR access memory and controls 432'.

CHANNEL UNIT - FIG. 3

Figure 3:
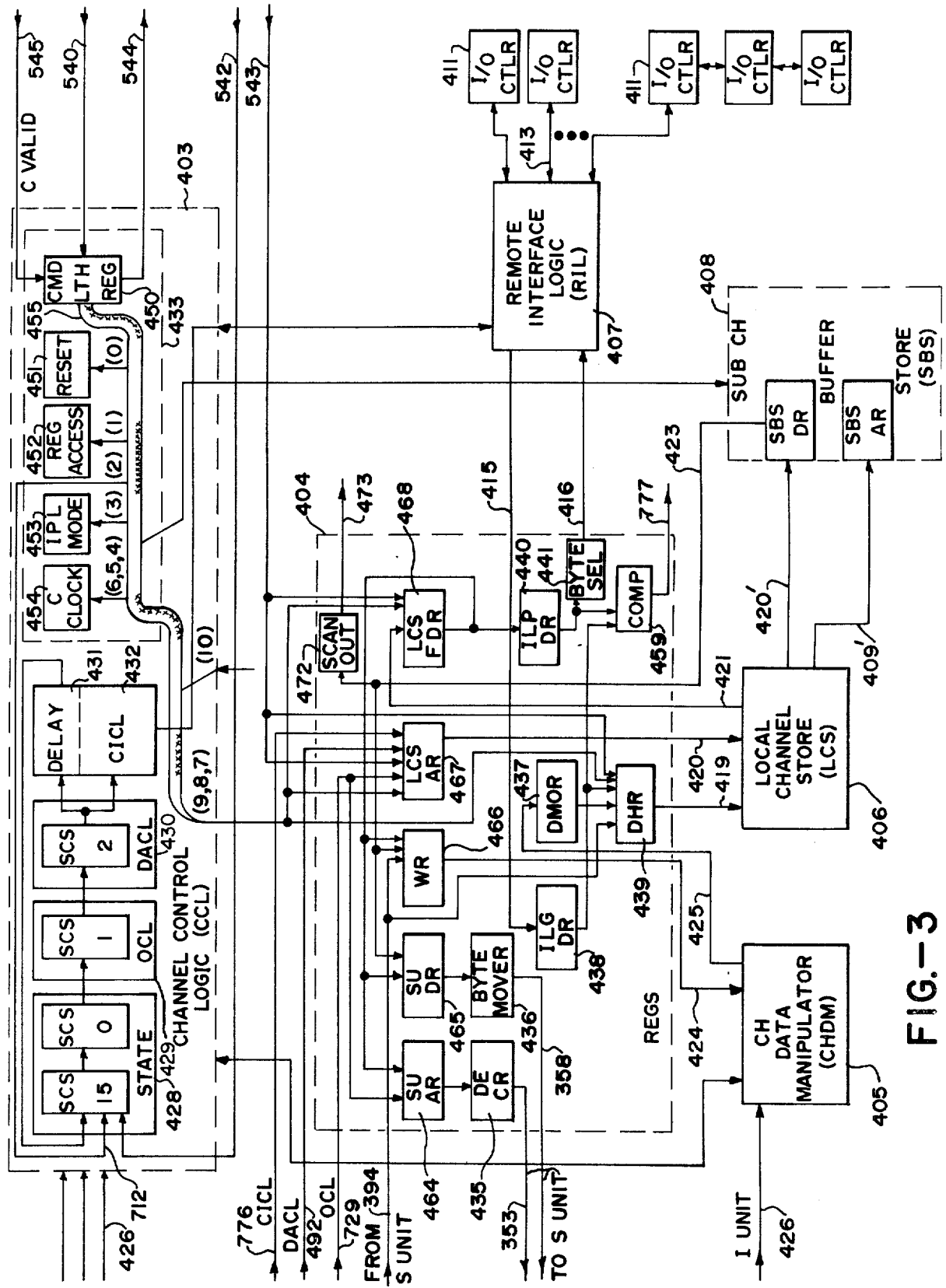
FIG. 3 depicts a further detailed schematic representation of the channel unit of the present invention.

In FIG. 3, the channel unit 6 represented in FIG. 1 and FIG. 2 is shown in further detail where the channel memory 448 of FIG. 2 is divided into three physical parts and the control logic is divided into four physical parts. The channel memory parts are the shifting channel state (SCS) store which includes stages SCS0 through SCS15 including the delay 431, the local channel store (LCS) 406 which includes a channel buffer store (CBS) and a subchannel state store (SSS) and the subchannel buffer store (SBS) 408. The control logic parts include the state controls 428, the OCL controls 429, the DACL controls 430 and the CICL controls 432. Additionally in FIG. 3, the channel unit-6 includes register circuitry 404, a data manipulator 405, and remote interface logic 407. The remote interface logic (RIL) 407 communicates with a plurality of I/O controllers 411. The C-unit 6 functions to interconnect I/O devices associated with the I/O controllers 411 with the remainder of the data processing system of FIG. 1.

The channel control logic (CCL) 403 includes, in accordance with the present invention, a shift register memory (SCS0 through SCS15) which is addressable for each channel of the C-unit 6. In FIG. 3, that memory includes state (STATE) locations 428 for controlling and specifying the state of an addressed channel, operation and control logic (OCL) locations 429 for specifying and controlling the operations of channels, data access control logic (DACL) locations 430 for controlling the accessing of data information from and to the S-unit of FIG. 1, and central interface control logic (CICL) locations 432 for accessing of information to and from the I/O controllers 411 through the remote interface logic (RIL) 407. In the present embodiment of the invention, the stages 428, 429, 430 and 431 are implemented by shift register stages which circulate their contents. In another embodiment, the storage in stages 428 through 431 is implemented with a random access memory. In each embodiment there is a location in storage with each channel and there is a method of accessing that location in memory.

In addition the channel control logic (CCL) 403 includes control 433 which communicates with the console unit 12 of FIG. 1 for carrying out console specified commands.

Command latch register 450 receives, on input bus, 13 bits of control data which are latched in command latch register 450 under a command on the latch control line 545 designated as C VALID. The bits in command latch register 450 are output on bus 455 where output bits 12 and 11 are input to the subchannel buffer store 408 for controlling store 408 in response to console commands.

Bit 10 from register 450 is input to the local channel store (LCS) 406 for controlling the local channel store on command from the console 12.

Bits 9, 8 and 7 from the register 450 are input to the registers 404 to control the registers with input information on bus 543.

Controls 433 include a channel clock network 454 which are inhibited or started under control of bits 6, 5 and 4 from register 450. Controls 433 additionally include an initial program load (IPL) mode circuitry 453 which controls the channel unit during the IPL mode of operation in response to bit 3 from register 450. Bit 2 from register 450 is communicated from the register 450 as an input to stage SCS15 of the state stages 428. Bit 1 of the register 450 is input to the register access control 452 which controls the loading of the register circuitry 404 via the input bus 543. Bit 0 of register 450 is input to re-set controls 451 which operates to reset the C-unit circuitry 6 in response to the bit 0 of the command register 450.

In FIG. 3, the registers (REG) 404 of the C-unit of FIG. 3 are shown in further detail. The registers 404 include a 32-bit storage unit address register (SUAR) 464, a 32-bit storage unit data register (SUDR) 465, a 32-bit working register (WR) 466, a 13-bit local channel store address register (LCSAR) 467 and a 32-bit local channel store fetch data register (LCSFDR) 468. The WR register 466 receives information from the S-unit via input bus 394 and has its output connected via bus 424 as an input to the channel data manipulator (CHDM) 405. The WR register 466 also has an input derived from the LCS FDR register 468 and from the sub-channel buffer store (SBS) 408 via bus 423. The data path widths have been, for simplicity in this specification, given generally, ignoring parity bits which are present in a conventional manner. For example, for 32 bits, 4 bits of parity are present one per 8-bit byte.

The SUAR register 464 also receives an input from the LCS FDR register 468 and provides its output to an address decrementer (DECR) 435 which has an input on bus 353 which connects as an input to the buffer address register (not shown) in the S-unit. The SUAR register 464 in cooperation with the decrementer 435 is operative to specify the address within the storage unit at which information is stored or fetched by the C-unit 6.

The SUDR register 465 is operative to store data to the storage unit via byte mover 436 and output bus 358. The data fetched on bus 394 into the data register 465 or stored via bus 358 is done at the location in the storage unit specified by the addresses on address bus 353.

Information fetched from the storage unit is also stored in the WR register 466 where it is transmitted via bus 424 to the channel data manipulator 405. Data from the channel data manipulator is received back via bus 425 and stored in the data manipulator out register (DMDR) 437. The register 437 has its output connected as an input to the data handling register (DHR) 439 which in turn has its output connected as an input to the local channel store (LCS) 406 and the subchannel buffer store (SBS) 408. Additionally, the DHR register 439 has an input from the interface logic data register (ILGDR) 438. The register 438 is connected to receive via its input bus 415 data from the remote interface logic (RIL) 407.

The remote interface logic 407 shown in FIG. 3 connects to the I/O controllers (control units) 411 and accordingly, the transfer of data into the data processing system from I/O devices is through the ILGDR register 438. When data is received into the registers 404 through the remote interface logic 407 it passes through the data register 438 to the local channel store 406 or the subchannel buffer store 408 before being further transmitted to the data processing system. When information is to be transmitted from the registers 404 out to I/O devices, the information is accessed from the local channel store via bus 421 and it is latched in the local channel store fetch data register 468, the output of which connects as an input to the ILPDR register 440. From the register 440, data to be transmitted to an I/O device is selected one or two bytes at a time from register 440 by byte selector 441. The output bus 416 from selector 441 includes 16 bits of data, two 8-bit buses (plus parity), which are connected as an input to the remote interface logic 407.

In summary, the registers 404 are operative to store data fetched from the S-unit via bus 394 or to store data into the S-unit via bus 358 at an address location in the S-unit specified by the address on bus 353. The information transferred between the registers 404 and the S-unit is also stored in the local channel store 406 or the subchannel buffer store 408 via buses 419 at an address specified by bus 420 and is accessed back into the register 404 from those stores via buses 421 and 423. For data transfers between the registers 404 and I/O devices, information is output through the remote interface logic on bus 416 and is input to the registers 404 from the remote interface logic.

C-UNIT CHANNEL DATA MANIPULATOR - FIG. 4

Figure 4:
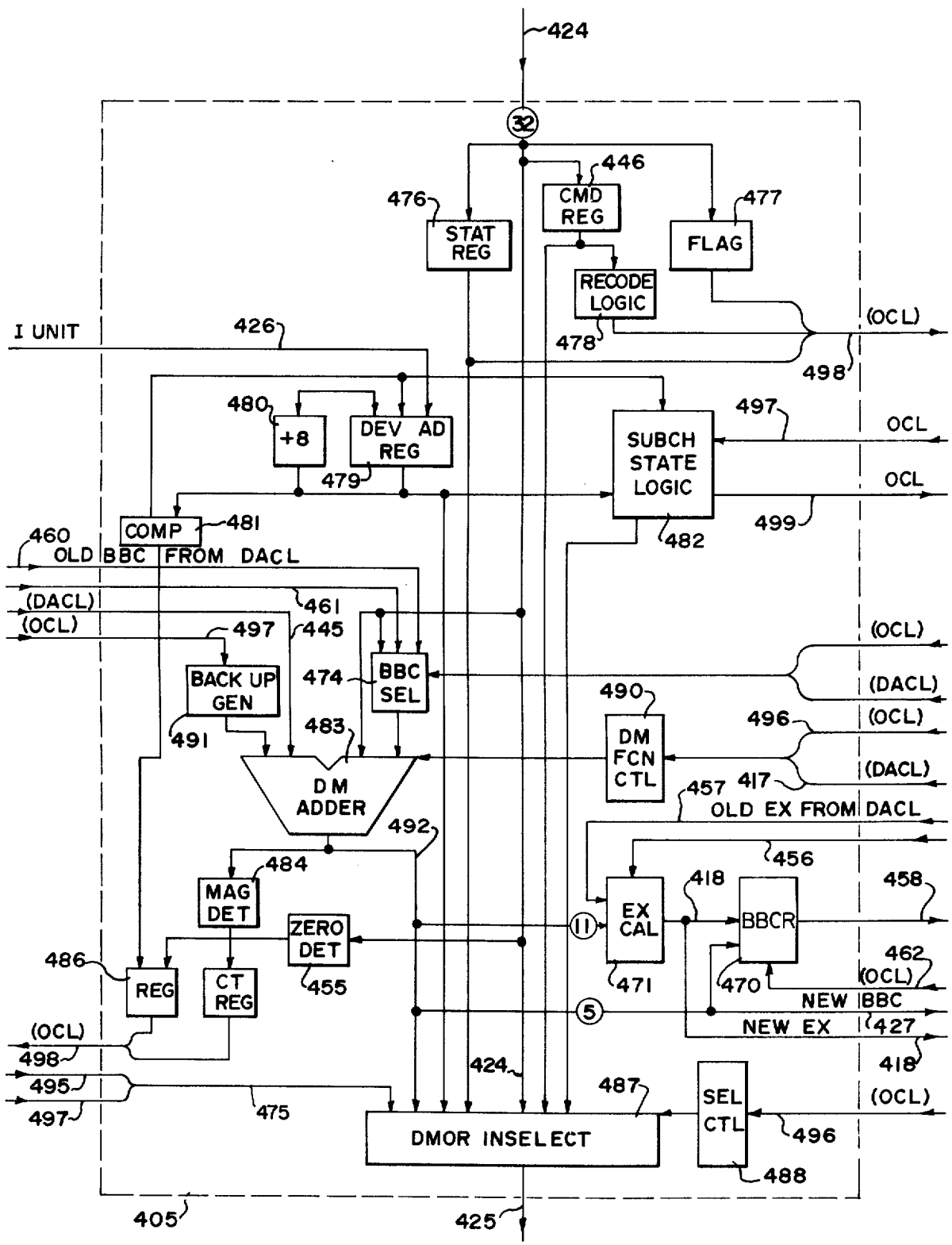
FIG. 4 depicts a schematic representation of the data manipulator which forms a part of the channel unit of FIG. 3.

In FIG. 4 the channel data manipulator 405 of the C-unit of FIG. 3 is shown in further detail. The data manipulator 405 receives the 32-bit input on bus 424 which connects to many locations within manipulator 405. Specifically, the input bus 424 connects as an input to the state registers 476, to the flag bits 477 and to the command register 446.

The state register 476 functions to hold status information concerning the operation of the registers and channels within the C-unit of FIG. 3. Registers 476 have an input to the inselect gates 487 and form a part of the input to the OCL 429 as part of the bus 498. The flags 477 function as storage devices for indicating when certain functions have occurred and similarly have an input to the OCL via bus 498. The command register 446 functions to latch command words and make them available through gate 487. Also, the register 446 contents is recoded into a more convenient format, in recode logic 478 and is then connected as an input to the OCL via bus 498.

Additionally, the input bus 424 connects to the subchannel state logic 482 which functions to control and analyze information related to subchannel information stored in the subchannel state store (SSS) which forms part of the local channel store 406 by causing SSS accesses based on the successively incremented contents of the device address register 479. The state logic 482 searches the information on bus 424 for the highest priority subchannel. The subchannel state logic 482 communicates with the OCL via an input from the OCL on bus 497 and via an output to the OCL on bus 499. Additionally, the subchannel state logic 482 responsive to the information on bus 497 and in the device address register 479 establishes a priority which is provided as an input to the inselect gates 487 for storage in the subchannel state locations of the local channel store 406.

Bus 424 also connects as an input to the device address register 479 where that register is employed to specify which device is to be processed under control of C-unit of FIG. 3. Device address register 479 is also loaded directly from the effective address register (EAR, not shown) on bus 426. The device address on bus 426 input to register 479 is eight bits. Those eight bits along with four higher order bits, for specifying the channel number, are input on bus 426 to the control multiplexor 704 in the state logic 428 of FIG. 6.

The device address register 479 is updated in increments of eight by the +8 incrementer 480 which receives an output from register 479 and forms a new input to the register 479. A comparator 481 receives an input from the register 479 and from the input bus 424 for detecting when the device address register 479 specifies the same device which is identified on bus 424. The results of the comparison in comparator 481 are stored in a register 486 which has its output connected to the OCL as part of bus 498.

Bus 424 also serves as one input to the data manipulator adder 483. Adder 483 also receives inputs from the data access control logic (DACL) on bus 492 for use in connection with data transfers between the S-unit and channel memories. Adder 483 has its output connected to the inselect gates via bus 492 for gating mainstore addresses and data counts into the local channel store 406 and the subchannel buffer store 408 of the channel memories where they are available to be accessed in connection with transfers of information. The adder of 483 also receives an input from a backup generator 491 which under control, via input bus 497, of the OCL functions to correct the address within channel memory at the termination of procedures in connection with a channel.

In FIG. 4, the data manipulator adder (DM ADDER) 483 receives an input from the buffer byte count select (BBC SEL) circuitry 474. The circuit 474 receives a 5-bit buffered byte count (BBC) which is the low-order five bits of the total 16-bit count field. The count field defines the total number of bytes of data to be transferred between the channel unit and the storage unit. In most instances, the buffered byte count (BBC) is received from the DACL action register 736 on line 460. Under some conditions when errors or other interruptions have occurred, the buffered byte count is received from the OCL on line 461. The circuit 474 also can select information from the bus 424 which is derived from the working register 466 in FIG. 3. During the start-up sequence and whenever a borrow is required from the high-order bits of the count field, the working register in FIG. 3 is loaded with the count field. During start-up before any byte transfer, the count field is input to the right-hand port of the adder 483. At other times during the processing when the high-order field of the byte count must be updated, the high-order bits are obtained from the working register 466 and the low-order bits (buffered byte count) are obtained from line 460 and together are input to the right-hand port of adder 483. The transfer length received is usually four since that is the maximum number of bytes that can be sent to storage unit at a time. Also this amount must be subtracted from the count field (and therefore BBC) on each storage unit transfer.

The left-hand port of adder 483 receives the actual byte transfer length (TL) which under usual circumstances is four signifying a four-byte transfer. The actual byte transfer length is subtracted from the remaining portion of the count field in adder 483 under the control of the data manipulator functional control (DM FCN CTL) 490.

The output from the adder 492 includes the new remaining count. During a start-up operation, nothing is subtracted from the initial count field and therefore the total count field appears on bus 492. A short sequence occurs during the processing to update the buffered byte count (low-order five bits) when a borrow from the high-order bits is not required. In the short sequence, the updated buffered byte count appears on the bus 492 and the high-order bits are ignored. A long sequence occurs when it is necessary to borrow from the high-order bits which are first fetched from the channel store to the working register 466. The high-order bits from the working register together with the buffered byte count (low-order bits) from the select circuitry 474 are input to the adder 483. The actual transfer length is subtracted to produce on the output bus 492 new remaining count.

The output from the adder 483 has the buffered byte count (five low-order bits) output on bus 427 to the DACL result register 737. Also, the eleven high-order bits are input to the extended bit calculator (EX CAL) 471. The calculator 471 includes an 11-input OR gate (not shown) which detects the existence of a logical 1 in any high-order bit of the count field. The output from the OR gate is selected whenever a new EX select signal appears on line 456 and appears on line 418. In an absence of a signal on line 456, the old value of EX on line 457 is retained and output on line 418. The value of EX on line 418 is defined as the new value and it is output directly to the DACL result register 737 and it is also latched into the buffered byte count register (BBCR) 470 along with the new value of the buffered byte count from bus 492 at a time when the OCL provides a latch signal on line 462.

The particular addition or function performed by the adder 483 is specified by the data manipulator function controller 490 which has control functions specified by the operation control logic OCL on input bus 496 from the control point decode 706 of the OCL. The six inputs on bus 496 from the OCL are correct count, backup count, correct data, backup data, increment by four, and increment by eight. The input on line 417 from the DACL specifies whether to add or substract.

The DMOR inselect gates 487 produce the outputs on the 32-bit bus 425 which serves as an input to the data manipulator output register 437 in the register unit 404 of FIG. 3. The contents of the 32 bits are selected and formulated under the control of selection controls 488. Selection controls 488 select information from the input bus 424, from the subchannel state logic 482, from the status registers 476, from the device address register 479, from the data manipulator adder output bus 492, from the command register 446, and from the input bus 475.

The input bus 475 to the inselect gates 487 receives eight bits each on bus 495 consisting of respectively channel number information, gated flag register information, and channel status information. Additionally, bus 475 receives four bits of data relating to new subchannel state information on bus 497 from the OCL. Also bus 475 receives input information derived from the state calculator 703 of FIG. 7 via bus 495.

C-UNIT CHANNEL CONTROL LOGIC AND STATE MEMORY - FIG. 5

The channel control logic (CCL) 403 within the FIG. 3 apparatus is shown in further detail in FIG. 6. In FIG. 5, the state 428, the operation control logic (OCL) 429, the data access control logic (DACL) 430 and the central interface control logic (CICL) 432 form the major parts of the channel control logic which cooperate with the channel state memory. Each of those parts is allocatable to one channel at a time and each may be allocated to different channels than the others.

The channel state memory is comprised of shift register stages 710, one for each channel. Shift register stages 710 comprises a shifting channel state (SCS) memory which determines the status of each channel, and signifies which channel is available for allocation to parts of the channel control logic (CCL). The sixteen stages 710 identified as SCS0, SCS1, . . . , SCS15 each, at any given point in time, contain information associated with a corresponding unique one of the channels identified as channels CH0, CH1, . . . , CH15. During an initial cycle at one point in time, SCS0 contains information relating to CH0, SCS1 contains information associated with CH15 and so forth until SCS15 contains information associated with CH1. During the next clock cycle, SCS0 contains information associated with CH1, SCS1 contains information associated with CH$\phi$. With each subsequent clock cycle, the channel information is stepped through the stages 710 in a conventional shift register fashion. After 16 cycles the information is again located as in the initial cycle. The clock input (not shown) to each of the stages 710 is conventional.

The first part of the channel control logic (CCL) 403 is the state circuitry 428 which is responsive to the stages SCS15 and SCS0 of the channel state memory. Stage SCS15 receives an input from stage SCS14, an input from the command latch register 450 of FIG. 3 on line 712, and an input on line 542 derived from the console unit 12 of FIG. 1.

The information is SCS15, during any given clock period, provides an input to the state calculator 703 where the configuration calculation in accordance with patch wire inputs on lines 708 reestablishes the configuration of the channel units and stores the results in SCS0. Additionally, the state precalculator 703 provides through register 702 an input to the immediate priority logic 714 the state of the channel associated with the contents of SCS15. At the same time, the control multiplexing unit 704 receives the four bit channel address on input bus 426 from the EAR (not shown) of the I-unit of FIG. 1. Control multiplexor 704 additionally receives op code and interrupt information on bus 426 which is supplied through register 702 to the OCL immediate procedure logic 714. In addition to the input received from the I-unit via bus 426, control multiplexor 704 supplies control information back to the I-unit control via bus 716 for setting condition codes and indicating when operations specified by the I-unit are complete. The control multiplexor 704 receives that condition code and op complete information via inputs from the OCL immediate priority logic 714 and from the OCL procedure logic 719.

The information in stage SCS15 is gated in each cycle into stage SCS0 where it is latched for one cycle. Similarly, stage SCS15 receives and latches new information in each cycle from stage SCS14.

SCS0 provides a 46-bit input to the OCL immediate procedure logic 714. The OCL immediate procedure logic 714 waits for the circulating stage information in the stages 710 to circulate until the information for that channel specified by the four channel bits on bus 426 circulates to stage SCS1. When that addressed channel has its state information is SCS1, the logic 714 determines the operation which is to be performed. If the addressed channel is determined by the state circuitry 428 is otherwise idle, then the OCL 429 operates to copy the contents of SCS1 into the OCL staging register 721 (OCLSR). Simultaneously, the OCL immediate procedure logic 714 causes an "instruction" to be gated into the OCL immediate register 722 (OCLIR). Register 722 causes, through one of its outputs, the OCL result logic 725 to change the channel state information for the addressed channel, currently located in SCS1, from "idle" to "operation pending". The change from idle to pending occurs when the information in SCS1 is gated through the result logic 725 to the SCS2.

With the information in SCS2 indicating that an operation pending condition exists, the staging register 721 contains information on what that operation is along with information sufficient to initiate that operation. During this time, the I-unit is waiting for a signal back on line 716 which will enable the I-unit to continue processing instructions within the instruction stream. The OCL procedure logic 719 with its input from the staging register 721 analyzes the contents of register 721 to initiate precedures which will access the channel memory (including the local channel store 406 and the subchannel buffer store 408). Those channel stores are accessed to obtain and latch the state of the addressed subchannel. The subchannel is identified by the data manipulator with its 8-bit, device number input on bus 426. The identity of the subchannel is calculated in the OCL LCSAR address generator 728 using the information in the device address register 479 and information in the OCLSR 721. The OCL procedure logic 719 through the register (PRTR) 724 initiates sequences in the OCL sequencer 726. The OCL sequencer 725 includes sequential logic routines for carrying out control functions, through the OCL control point decode 706, which causes the registers 404, the data manipulator 405 and the four parts 428, 429, 430 and 432 of the channel control logic 403 to carry out their required functions.

When the procedure logic 719 has caused the sequencer 726 to initiate a specific procedure, procedure logic 719 is then in a wait state awaiting for completion of that procedure. When the logic 719 receives a signal on input bus 498 indicating that an initiated procedure has been completed, a decision is made as to what the next procedure, if any, is. When all of the procedures specified by logic 719 have been carried out, procedure logic 719 signifies that condition with a signal to the result logic 725. Result logic 725, thereafter when the associated channel information in staging register 721 also is shifted into the state SCSL causing a change in the channel state information setting from "operation pending" to "initial selection". As part of one of the procedures, the OCL LCS AR addressing generator 728 addresses via output bus 729 into the LCS address register 467 in the register unit 404. That address latched into register 467 is then used to access the appropriate location in the LCS 406 or the SBS 408 both of which are shown in FIG. 3.

The channel state information of all the channels as modified from time to time as previously indicated, is transmitted through stage SCS2 where the data access control logic 430 senses that stages content in each cycle. Whenever the information in SCS2 indicates that a transfer between the channel memory and the storage unit is required, the DACL priority and result logic 734, provided that logic is not busy, loads the appropriate information into the DACL staging register (SR) 735 from where it is transferred into the DACL action register (AR) 736. Register 735 specifies the next transfer while register 736 specifies the present transfer. The register 736 through its input to the DACL action logic 739 controls transfers between the storage unit and the channel memory. The register 737 stores information concerning the last transfer and provides through its output to the priority and result logic 734 the fact of completion of the desired transfer. Logic 740 at the appropriate time stores in stage SCS2 an indication that the appropriate transfer is complete.

In a similar manner, the central interface control logic 432 is responsive to the stages SCS3 through SCS14 through which state information for all channels is shifted as previously described. The CICL ISR 756 derives inputs either from the SCS2 or from the SCS10 stage depending on the enabling of the gates 751 through 754.

The information through gates 751 through 754 into the CICL initiate sequence register 765 is in turn connected as an input to the CICL control logic 757. The gates 751 through 754 are controlled by lines 770 and 771 from the remote interface logic (RIL) of FIG. 3. They function to determine which of the two inputs (SCS2 or SCS10) as to register 756. The particular one of the channels which gains access to register 756 causes the control logic 757 to initiate transfers between the channel memory and the I/O controllers through the remote interface logic (RIL).

DATA ACCESS CONTROL LOGIC - FIG. 6

In FIG. 6, the data access control logic (DACL) which forms one part of the channel control logic of FIG. 5 is shown in further detail. The second state, SCS2, of the shifting channel state memory cyclically receives information from the SCS1 stage on bus 742. For each cycle, information concerning a new channel is available to the DACL. SCS2 cyclically outputs information to the SCS3 stage on bus 743 and to the CICL on the bus 744.

The information in the stage SCS2 for each cycle is input to the DACL priority logic 734 via bus 746 to determine if the channel in stage SCS2 has the highest priority for an action by the DACL of FIG. 6. If it does, the actual transfer length (TL) to be undertaken is output on a 2-bit bus to the staging register 735. The priority determination in logic 734 can be, for example, merely an indication of whether or not the DACL is currently busy and, if not, granting priority to whatever channel is currently in SCS2 by loading information into staging register 735 with a clock signal. Other more intricate priority relationships, of course, can be employed.

The actual transfer length (TL) of a transfer to be made by the DACL is typically four bytes and is determined by a 2-bit TL code from the logic 734 which is loaded into staging register 735. Other lengths are employed for example if at the end of a transfer less than four bytes remain to complete the transfer. In that case, the actual length code TL represents 3, 2, or 1 byte as is appropriate. The logic 734 also accounts for other special conditions, such as transfers approaching a page boundary, and produces control signals on the 3-bit line DTP and the 2-bit line TP. These controls are not necessary for use in connection with the present invention and are not discussed further.

The staging register 735 accepts information from logic 734 and directly from stage SCS2 on 23-bit bus 746. That information includes the 1-bit old EX, the 5-bit old BBC, the channel number, and other control information not pertinent to the present invention. Of particular interest in the present invention is the old BBC field which stands for buffered byte count (BBC) and the 1-bit EX field which stands for extended BBC BIT (EX). The BBC field is the low-order five bits of the remaining count field. The EX bit signifies whether any of the 11 high-order bits are present in the remaining count field. The staging register 735 holds among other things the BBC, that is, low-order five bits of the desired count field, the EX indication of whether any high-order eleven bits exist in the 16-bit count field, and the TL indication of the actual transfer length to be undertaken in the present operation of the DACL. The information in staging register 735 defines the next transfer to be performed by the DACL. The contents of the action register 736 represents the transfer currently being performed by the DACL. When the current transfer is completed, the information about the next transfer in register 735 is loaded into register 736.

The contents of the action register 736 are input to the DACL action logic 739. The action logic 739 is combinatorial logic which steps through a fixed sequence as a function of the input from action register 736. The action logic uses the action state register 739-2 for storing the sequencing states of the DACL action logic. The sequencing of the action logic 739 controls many timing signals which are output on control bus 748. The timing signals on bus 748 are conventional latching and transferring data and their specific sequences are defined hereinafter in connection with the operation of the present invention.

The action logic 739 includes a conventional comparator for comparing TL, the actual transfer length desired, with the old BBC. If TL is less than or equal to BCC, the actual transfer can occur with a short sequence and hence the action logic 739 and state sequence register 739-2 causes a short sequence to be carried out as hereinafter explained. If TL is greater than BBC, then the old EX field is examined. If EX is set (meaning high-order bits exist) at a time when TL is greater than the old BBC, then the action logic 739 and state sequence register 739-2 specifies a long sequence. The long sequence fetches the high-order bits from the channel memory and thereafter replaces the remaining count field into channel memory. If BBC is less than or equal to the maximum transfer length TL (in this case 4) and EX is not set, then the short sequence is followed. When the old BBC is reduced to all 0's, and the EX is not set, the original transfer is complete and the count exhausted.

In general, the outputs from the action logic 739 cause the transfer of bytes of information between the channel memory and the storage unit. In addition to making the actual transfer of bytes of information, the action logic 739 causes the remaining count field to be decremented by the amount of the actual transfer. In accordance with one embodiment of the present invention, the decrementing of the count field is achieved by initially decrementing the BBC circulating in the state memory and the count field in local channel store if necessary. When a borrow from the high-order bits is necessary, a long sequence is empolyed to access the high-order bits from the local channel store 406, to decrement the total remaining count field, and to store the new remaining count field back into the store 406.

The old BBC and the old EX, prior to the actual transfer, appear in the action register 736. The old BBC is output on the 5-bit bus 460 to the data manipulator circuitry of FIG. 4. Similarly, the old EX from register 736 is output on 1-bit line 457 to the data manipulator of FIG. 4. After processing by the data manipulator, the new EX on 1-bit line 418 is received from the data manipulator and is stored in the result 1 register (R1R) 737. Similarly, the new BBC is received on 5-bit bus 427 and is stored in the R1R register 737. The channel number is input to the result register 737 from a register 749 which stores the value of the last channel having control of the DACL. The channel number in register 749 is derived from the action register 736. When the channel number, the new BBC, and the new EX are input to the register 737, they are available for loading to the result 2 register (R2R) 741. The channel numbers in both the result registers 737 and 741 are available as inputs to the priority logic 734. In this manner, the channels having control of the DACL may be used to decide that the channels presently being serviced by the DACL have no priority to use the DACL. With the new BBC and the new EX values in the register 741, they are available for posting back into the state memory through the DACL result logic 740.

Logic 740 includes a conventional comparator which receives the channel number from SCS1 on bus 750 from bus 742 and compares it with the channel number in R2R register 741. When a compare occurs, the new EX and new BBC values in register 741 are gated through the result logic 740 to the bus 745 where they are inserted into the SCS2 stage along with information from SCS1. The old BBC and old EX in SCS1 are discarded. The amount of time required to make the transfer to the storage unit and new values of EX and BBC can be inserted into the SCS2 stage is a function of whether or not only the low-order field (BBC) need updated with a short sequence or whether a borrow is required and the entire count field must be updated with a long sequence.

CHANNEL UNIT OPERATION

Operation of the channel unit in accordance with the present invention is described in accordance with a typical instruction "START I/O FAST RELEASE"- (SIOF). As initial conditions, all channels, 16 in accordance with the present example, are idle and must be initiated through the initial program load (IPL) or alternatively by a reset command. With the initial program loading carried out, instructions are loaded into the main store and instructions are fetched and processed by the I-unit. As part of the initial program loading, any I/O instruction such as SIOF sets up in storage a sequence of channel commands which effectively are a channel program. Also the initial loading places a pointer in a fixed location of memory, for example location 72 in the present system, which identifies the location of the first command in the channel command sequence. When the start I/O command is fetched by the I-unit, the effective address register in the I-unit is loaded with information which is communicated to the channel unit via bus 426. The channel unit recognizes the start I/O instruction in the state logic and waits for the addressed channel information, which is circulating through the stages SCS0 through SCS15, to arrive at the SCS1 location causing notification of the immediate procedure logic when the appropriate one of 16 channels arrives at the SCS1 location. Assuming, for purposes of this example, that the state of the addressed channel is idle, the OCL allows the contents of SCS1 to be entered into the staging register 721 while the result logic 725 changes the state of the channel (assume channel 5 as a typical example) indicating by latching into SCS2 the operation pending condition. During each cycle, the channel information is stepped one stage at a time through the stages 710 so that after 16 cycles, each channel's information has stepped through all of the stages SCS1 through SCS15.

For a start I/O instruction, the channel information continues to step through the stages 710 where the OCL circuitry 429 becomes dedicated to a specific channel, channel 5 in the present example. While circuitry 429 is dedicated to channel 5 for processing, the other parts of the channel control logic (STATE DACL, CICL) can be employed in the processing of channels other than channel 5.

For a SIOF instruction, the I-unit is waiting for the channel unit and particularly the OCL to finish processing its part of the channel function. Specifically, for a SIOF instruction the OCL is responsible for fetching a channel address word into the channel buffer store while checking to insure that the subchannel state store is available for processing the identified addressed device. Assuming that the subchannel identified is device 25, (thereby implicitly identifying a subchannel), the procedure logic 719 after accessing the channel address word, and thereby locating the address of the first channel command word, stores command pointers into the channel buffer store of the LCS and performs validity checks on the information. In carrying out its functions, the OCL uses common data paths and memory to control the functions.

With the accessing of the first channel command word, the procedure logic 719 signifies to the control multiplexor 704 that the SIOF instruction of the I-unit of the data processor has been completed as signified on the return lines 716, thereby allowing the I-unit to continue processing further instructions in its instruction stream.

With the first channel command word fetched the procedure logic 719 notifies the result logic 725 that the initial selection state for the associated channel 5 should be entered into the data transferred from SCS1 to SCS2 whenever the channel 5 information next is loaded into SCS1 during its normal shifting cycles. When the CICL circuitry 432 in logic 757 detects the initial selection state of any channel, it causes a channel buffer store (CBS) access in order to obtain a device addresss and a command and to route it to the correct physical interface and the correct I/O controller using the remote interface logic 407 of FIG. 3.

Assuming the first command is to transfer information from the control unit to the main store, the CICL manipulates the control lines and the LCS causing data to be transferred from the I/O controllers to the LCS. The CICL through control logic 757 and output bus 780 to the appropriate channel stage SCS4 or SCS12, maintains a record of what locations of LCS contain the transferred data. When a sufficient amount of data is gathered into the LCS, the DACL recognizes the necessity of a transfer to main store by observing the state of channel 5 as it appears in the SCS2. At this point, the DACL will cause a transfer of data from the LCS to main store.

When the channel command word was obtained from the I-unit of FIG. 1, it is transmitted under control of the OCL over bus 394 to the working register(WR) 466 in FIG. 3. From there it is transmitted through the data manipulator 405 to the bus 425 without alteration and is latched into the DMOR register 437. From there it is latched in the DHR register 439 and stored in the local channel store 406. In that way, the 16-bit count field initially becomes stored in the channel store 406.

When the count field from the channel command word is gated from the WR register 466, it passes through the adder 483 in the data manipulator of FIG. 4 and appears unaltered on bus 492. On the bus 492, the five low-order bits are extracted and loaded into the BBCR register 470. From there, the initial value of the new BBC is gated to the OCLRR register 467 in FIG. 5.

At the same time in the manipulator of FIG. 4, the eleven high-order bits of the total transfer length field are input to the EX calculator 471 where in high-order bits are OR'ed to form the initial new EX signal on line 418 which is stored also in BBCR register 470 and transferred to OCLRR register 467. From register 467, the initial new EX and BBC values are gated by logic 725 into SCS2 when SCS1 contains the appropriate channel number.

As a typical example, a total count of thirty-six bytes is assumed. In the 16-bit count field, the eleven high-order bits include ten high-order 0's followed by a 1 and the low-order five bits are 00100. The count appears in binary notation as 100100 preceded by ten high-order 0's.

With the above typical example, the initial new BBC stored in SCS2 by the OCL is 00100. The value stored in SCS2 for the initial new EX bit is 1, since the lowest-order bit in the high-order eleven bits is 1.

With the initial new BBC and the initial new EX stored in SCS2, the DACL is ready to commence a transfer of 36 bytes of data whenever channel number 5 obtains priority for use of the DACL. When channel 5 does obtain priority, the BBC and the EX for channel 5 in SCS2 are gated through to the action register 736. In register 736 the BBC and the EX are now treated as the old BBC and the old EX and are examined in action logic 739. Assuming that the usual case actual transfer length TL is four bytes, the value 100 of TL is compared with the BBC in register 736 by logic 739. Since BBC having a value of 00100 is equal to or greater than the value of TL which is 100 action logic 739 calls for a short sequence. The short sequence is identified in the following CHART I.

CHART I — Short Sequence

| Cycles | CHANNEL TO S-UNIT | Cycles | S-UNIT TO CHANNEL |
|---|---|---|---|
| 1&2 | Fetch Data Address | 1&2 | Fetch Data Address |
| 3&4 | Fetch Data | 3&4 | "Not Used" |
| 5&6 | Store Data Address | 5&6 | Store Data Address |
| 7&8 | "Not Used" | 7&8 | Store Data |

In making the short sequence transfer of data from the channel store to the storage unit, the data address in the channel store must be first accessed from the channel store and placed in the storage unit address register 464 of FIG. 3. Each access of the channel store requires two cycles. Next, the data itself must be fetched from the channel store using the address in register 467. The accessed data is output on bus 421 and stored in the register 468 from where it is transferred to register 465 and out to the storage unit through bus 35B. Finally the modified data address which identifies the next byte to be transferred is stored back into the local channel store 406. A similar sequence is employed for a transfer of information from the storage unit to the local channel store 406.

During the above short sequence identified in CHART I, a transfer of four bytes occurs between the storage unit and the channel unit. Accordingly, the TL value 100 must be subtracted from the initial total count field to form the remaining count field. The TL value 100 is subtracted from the BBC value 00100 in the data manipulator and forms a result of 00000 which is the new BBC.

Note that since the initial BBC was 100, the 100 subtraction of TL was made without needing a borrow from the high-order field. Therefore the old EX bit remains valid and is selected to be the new EX bit. Hence new EX=1.

After subtraction of 100 from the BBC, the new BBC is 00000. That new BBC is, of course, stored in the R1R register 737 and subsequently R2R 741 of FIG. 6 and is transferred to the SCS2 thus momentarily completing the use of the DACL by channel 5.

With the new EX and the new BBC stored in the SCS2 stage, the state memory continues to circulate until channel 5 again reappears in SCS2 and obtains priority for use of the DACL. Since the total transfer of thirty-six bytes has not occurred, channel 5 will again at some time be given priority by the priority logic 734 in FIG. 6. When channel 5 gains priority, the channel 5 number, a new TL value of four bytes, the now old BBC(00000) and the old EX(1) are gated into the staging register 735. The old BBC (00000) and the EX bit(1) are gated to the data manipulator on buses 460 and 457, respectively.

In the present instance, the TL value equal to 100 cannot be subtracted from the old BBC equal to 00000 without a borrow from the high-order bits which are known to exist because EX is 1. Accordingly, a long sequence must be followed in order to properly subtract the actual transfer length(100) from the remaining count(100000) arrived at, as always, by concatinating the high-order eleven bits of the count word in LCS with the BBC field of SCS. The long sequence is summarized in the following CHART II.

CHART II — Long Sequence

| Cycles | CHANNEL TO S-UNIT | Cycles | S-UNIT TO CHANNEL |
|---|---|---|---|
| 1&2 | Fetch Data Address | 1&2 | Fetch Data Address |
| 3&4 | Fetch Data | 3&4 | Fetch Count |
| 5&6 | Fetch Count | 5&6 | Store Modified Data Address |
| 7&8 | Store Modified Data Address | 7&8 | Store Modified Count |
| 9&10 | Store Modified Count | 9&10 | Store Data |

In the long sequence in the above CHART II, the two additional steps of Fetch Count and Store Modified Count are added. During the Fetch Count step, the total count field, including the eleven high-order bits, are fetched from the local channel store and are gated to the register 468 from where it is transferred to the working register 466. In the data manipulator of FIG. 4, the high-order eleven bits from register 466 (1 preceded by ten 0's) are concatinated with the low-order bits (which is the old BBC of 00000 on bus 460) and are input to the right-hand port of the adder 483. Concurrently the TL value of 100 is input to the left-hand port of adder 483 and the left input is subtracted to form the result on bus 492. When 100 is subtracted from 100000, the result on bus 492 is 011100.

The new BBC is 11100 and the new EX is 0. Since in the particular example chosen, all eleven high-order bits are 0 so that the new EX bit is now set to 0. Also, it is necessary to store back the count in the LCS since it presently contains a non-zero high-order eleven bit count field. The new EX equal to 0 and the new BBC equal to 11100 are stored in the result registers 737 and 741.

When channel 5 again appears in SCS1, a comparison is made in the result logic 740 and the new EX and the new BBC are stored in SCS2. The information in SCS2 continues to circulate in the state memory until the priority logic 734 again determines that channel 5 has priority. At this point, the channel 5 number, the now old BBC(11100) and the old EX(0) are input to the action register 736. The action logic 739 determines that the old BBC(11100) is greater than the actual transfer length 100 so that a short sequence is called for.

The short sequence is repeated as given in CHART I above. Four bytes of data are transferred from the channel memory to the storage unit while the high-speed data manipulator subtracts 100 from the old BBC 11100 to form the new BBC equal to 11000. From this point on the O value for the EX bit does not change since no borrows are needed from the old BBC.

The operation continues with a short sequence until the new BBC has been reduced to 00000. Since EX is also $\phi$, at this time, both the DACL and OCL can determine that the data transfer is complete.

When all data has been transferred, the OCL notes this fact and causes the result logic 725 to operate on the channel state such that channel 5 becomes idle. Thereafter, channel 5 is available again for transferring information from the I/O controllers to the storage unit.

While the above example has been given in connection with a single channel, that is channel 5, it is apparent that while the different parts of the channel control logic are operating on the channel 5 transfer, they can be concurrently operating on other channels. For example, while the state logic 428 is busy with channel 5, the OCL logic 429 can be operating on the control information associated with some other channel while simultaneously the DACL logic 430 may be processing still a third channel while the CICL is processing still a fourth channel. As each part of the channel control logic 403 becomes available it accepts an input from the shifting channel state(SCS) and begins processing an appropriate channel.

While the invention has been particularly shown and described with reference to preferred embodiments thereof it will be understood by those skilled in the art that various changes in form and details may be made therein without departing from the spirit and scope of the invention.

What is claimed is:

1. A data processing system including system storage apparatus and channel unit apparatus for transmitting data received from input/output devices over a plurality of channels to said storage apparatus, the improved channel unit apparatus comprising, channel store means for storing information including said data to be transferred over said channels, state memory means, common to all of said channels, having a plurality of groups of locations, one group for each of said channels where each group stores information for a different associated channel; said state memory means including, for each group, first locations for storing a count to designate a remaining transfer length where the remaining transfer length specifies a number of bytes of said data remaining to be transferred over the associated channel, and data access control means, common to all of said channels, for controlling the transfer of said data over said channels, said control means including means connected to said state memory means for cyclically accessing the locations for each channel, means for storing said count in each of said first locations, and means for requesting a data transfer, having a requested transfer length, over each channel in response to a decode of said count in each of said first locations, said control means including means for decrementing the count in said first locations for each actual data transfer by a count equal to the requested transfer length; said control means including means connected to said channels and responsive to information stored in said memory means for controlling the accessing of said channel store means for the fetching and storing of said data for each channel.

2. The apparatus of claim 1 wherein said control means includes, means for storing low-order counts in said first locations for each channel and means for storing corresponding high-order counts in said channel store means for each channel, where each of the corresponding concatenated high-order byte portion and low-order byte portion counts specify the full byte count and where the full count specifies the total number of bytes of data remaining to be transferred over the associated channel, said control means including means for detecting whenever the requested transfer length is less than the low-order count, means for accessing said high-order count from said channel store means, and means for decrementing the full count including said high-order count and said low-order count to form a new full count.

3. The apparatus of claim 1 further including addressing means for addressing said channel store means to fetch or store data to be transferred, addresses of data to be transferred, and high-order counts representing the high-order lengths of data to be transferred where the counts in said first locations represent the corresponding low-order lengths of data to be transferred, and wherein said data access control means further includes sequential logic means for sequencing said addressing means in a short sequence for accessing said channel store means to fetch a data address, to store a modified data address and to store or fetch data; and for sequencing said addressing means in a long sequence for accessing said channel store means to fetch a data address, to store a modified data address, to fetch or store data, to fetch a count and to store a modified count, said control means further including means for sensing the low-order count in said first locations for each channel, and including means for detecting when the requested transfer length is less than or equal to said low-order count to enable said short sequence and means for detecting when the requested data transfer length is greater than said low-order count to enable said long sequence.

4. The apparatus of claim 3 wherein said state memory means further includes a second location, for each group, for storing an indication of whether any high-order non-zero count is stored in said channel store means and wherein said data access control means further includes means for comparing the requested data transfer length when said low-order count in said first locations to cause said sequencing logic means to follow a long sequence if the requested data transfer length exceeds the low-order count and said second location indicates that a high-order non-zero count is stored in said channel store means.

5. The apparatus of claim 1 further including addressing means for addressing said channel store means to fetch or store data to be transferred, addresses of data to be transferred, and high-order counts representing the high-order lengths of data to be transferred, where the counts in said first locations represent the corresponding low-order lengths of data to be transferred, and wherein said data access control means further includes sequential logic means for sequencing said addressing means in a short sequence for accessing said channel store means to fetch a data address, to store a modified data address and to store or fetch data; and for sequencing said addressing means in a long sequence for accessing said channel store means to fetch a data address, to store a modified data address, to fetch or store data, to fetch a count and to store a modified count, said state memory means further including a second location, for each group, for storing an indication of whether any associated high-order non-zero count is stored in said channel store means, said control means further including means for sensing said first and second locations for each channel and including means for comparing the requested transfer length with said low-order count in said first locations to cause said sequencing logic means to follow a long sequence if the requested transfer length exceeds the low-order count and said second locations indicate that a high-order non-zero count is stored in said channel store means.

6. The apparatus of claim 5 wherein said state memory means includes a plurality of shift-register stages, one stage for such group, where each stage stores said first and second locations for a different one of said channels, said shift-register stages connected to cyclically shift whereby said data access control means sequentially receives the information for different channels.

7. The apparatus of claim 6 wherein said data access control means includes means for storing a modified low-order count into a shift-register stage to replace the old low-order count for the same channel after an actual data transfer.

8. A data processing system including system storage apparatus and channel unit apparatus for transmitting information over a plurality of channels between input/output devices and said storage storage apparatus, the improved channel unit apparatus comprising, channel store means for storing information from or to input/output devices to be transferred over said channels, said channel store means having addressable locations associated with each channel, said addressable locations including, for each channel a first storage area for storing the next address in a third storage area of said channel store means of data to be transferred, a second storage area for storing the high-order counts designating the high-order length byte portion of the number of bytes of data to be transferred, and a third storage area for storing the data to be transferred, state memory means having a plurality of groups of locations, one group for each of said channels; said state memory means including, for each group, first locations for storing low-order counts to designate the low-order byte portion of the number of bytes of data remaining to be transferred over the associated channel and including, for each group, a corresponding second location for designating if a high-order non-zero count is stored in said second storage area of said channel store means, and control means for requesting a data transfer of information over said channels from or to said third storage area, said control means including means connected to said state memory for cyclically accessing the locations for each channel and for causing a data transfer over each channel in response to a decode of said count in each of said first locations, said control means including means for decrementing the low-order count in said first locations for each data transfer and means for decrementing the high-order count in said channel store means in conjunction with said low-order count when the length of a requested data transfer exceeds said low-order count and the corresponding second location indicates a high order non-zero count is stored in said channel store means.

9. The apparatus of claim 8 further including addressing means for addressing said channel store means to fetch and store data to be transferred, to fetch and store addresses of data to be transferred, and to fetch and store high-order counts representing the high-order length, and wherein said data access control means further includes sequential logic means for sequencing said addressing means in a short sequence for accessing said channel store means to fetch a data address, to store a modified data address and to store or fetch data; and for sequencing said addressing means in a long sequence for accessing said channel store means to fetch a data address, to store a modified data address, to fetch or store data, to fetch a count and to store a modified count, said control means further including means for sensing a low-order count in said first locations for each channel, and including means for detecting when a requested data transfer length is less than or equal to the low-order count to enable said short sequence and means for detecting when the requested data transfer length is greater than the low-order count to enable said long sequence.

10. The apparatus of claim 9 wherein said state memory means includes a plurality of shift-register stages, one stage for each group, where each stage stores said first and second locations for a different one of said channels, said shift-register stages connected to cyclically shift whereby said data access control means sequentially receives the information for different channels.

11. The apparatus of claim 10 wherein said data access control means includes means for storing a modified low-order count into a shift-register stage to replace the old low-order count for the same channel after an actual data transfer.

12. The apparatus of claim 11 further including data manipulator means for performing subtraction of the actual tranfer lengths from the catenated high-order and low-order count said data manipulator means including means for detecting any high-order non-zero count and responsively setting an indication in said second location for each channel.

13. In a data processing system including system storage apparatus and channel unit apparatus including a channel store means and a state memory for transmitting over a plurality of channels information between input output devices and said storage apparatus, the improved method comprising, storing the address of data to be transferred in a first storage area of the channel store means, storing the high-order counts, designating the high order length byte portion of the number of bytes of data remaining to be transferred, in a second storage area of the channel store means, storing the data to be transferred in a third storage area of the channel store means, storing low-order counts in first locations, for each channel, in the state memory to designate the low-order byte portion of the number of bytes of data remaining to be transferred over the associated channel, storing an indication in a second location, for each channel, in the state memory for designating if a high-order non-zero count is stored in the channel store means, cyclically accessing the locations for each channel and transferring data over each channel in response to a decode of said count in each of said first locations, and decrementing the low-order count in said first locations for each data transfer, and decrementing the high-order count in said second storage area of the channel store means in conjunction with said low-order count when the length of a requested data transfer exceeds said low-order count and said second location indicates a high-order count is stored in the channel store means.

* * * * *